T. Fowler.
Horse Shoe Nail Mach.
№64,963.   Patented May 21. 1867.
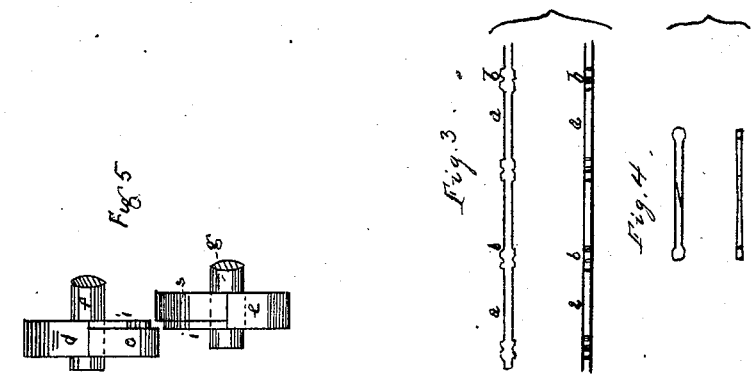
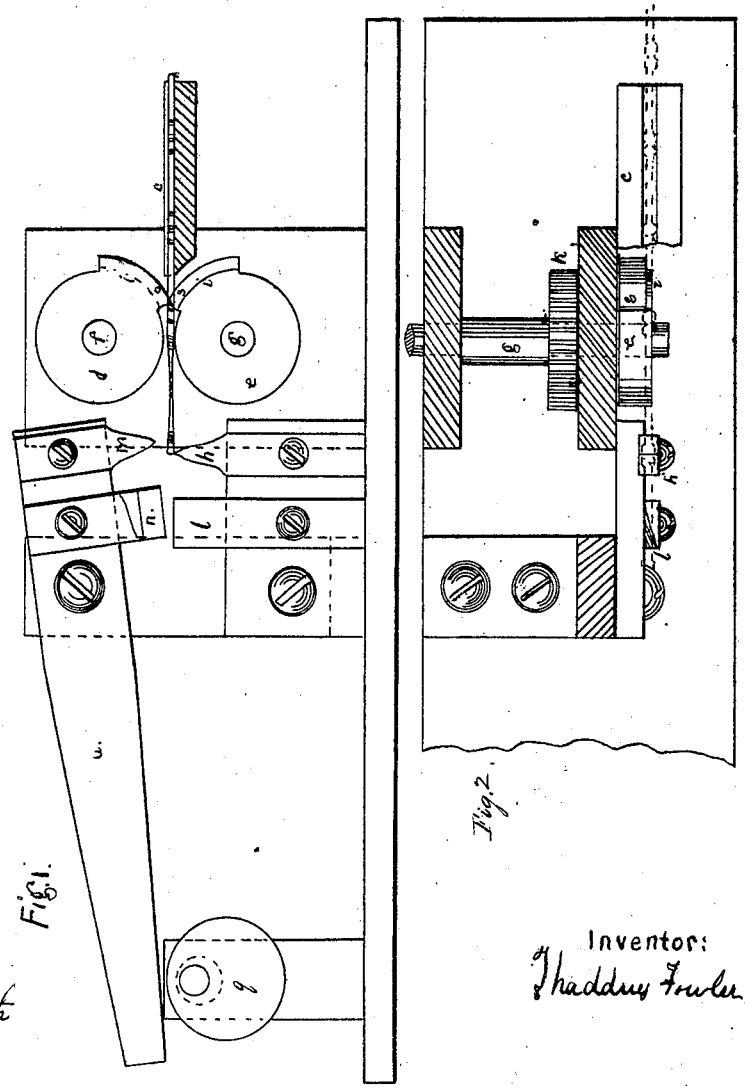
Witnesses:
Chas H Smith
Geo D Walker
Inventor:
Thaddeus Fowler

United States Patent Office.

THADDEUS FOWLER, OF SEYMOUR, ASSIGNOR TO THE FOWLER NAIL COMPANY, OF NEW HAVEN, CONNECTICUT.

Letters Patent No. 64,963, dated May 21, 1867.

---

IMPROVEMENT IN MACHINERY FOR MAKING NAILS.

---

The Schedule referred to in these Letters Patent and making part of the same.

---

TO ALL WHOM IT MAY CONCERN:

Be it known that I, THADDEUS FOWLER, of Seymour, in the county of New Haven, and State of Connecticut, have invented and made a certain new and useful Improvement in Machinery for Making Horse-Shoe Nails; and I do hereby declare the following to be a full, clear, and exact description of the said invention, reference being had to the annexed drawing, making part of this specification, wherein—

Figure 1 is a side view of my machine for rolling out the body of the nail and separating the nails from a bar.

Figure 2 is a sectional plan with the upper roller removed, and showing the mode in which the nails are separated at their points.

Figure 3 shows the bar in side and edge views in the condition in which it is prepared before presentation to this machine; and Figure 4 is a side and edge view of the nail after being acted on by this machine.

Similar marks of reference denote the same parts.

Nails have heretofore been manufactured from rods by rollers acting on opposite sides to reduce the rod into the form of a nail. Difficulties have been experienced in this mode of manufacture, in consequence of the rollers not corresponding in their action, for if the nail blanks, in their first reduction, are too long or too short but a hair's breadth on each nail, the nails on the rod are spoiled by the impression of the second pair of rollers not coming upon the proper part of the nail-rod, especially towards the last end of the rod The nature of my said invention consists in a pair of rollers that feeds the nail-rod along by taking against the sides of the heads formed in the first reduction; thereby each nail-blank is moved along the proper distance, and then the rollers cease their hold upon the rod, hence there is a progressive feed of the nail-rod, and the difficulty before mentioned is avoided, and all the reductions of the nail-rod subsequent to the first are determined in position by the feeding movement acting against the nail-heads successively. I make the horse-shoe nail in the required pointed form by dividing the reduced nail-blank by a diagonal cut that leaves the nail with the point on the line of one side, and I straighten the nail and finish it by mechanism forming the subject of a separate application.

In the drawing, $a$ represents the shank portion, and $b$ the heads in the nail-rod. These are formed by running a rod through a pair of rollers that acts upon the edges of the rod, leaving the same in about the shape represented in fig. 3. The nail-rod thus prepared is laid into a trough, $c$, in which it may be steadied by hand or a spring-clamp to keep it in place as drawn along progressively by the pair of rollers $d\ e$. These rollers $d\ e$ are upon the shafts $f$ and $g$ that are geared together by the wheels $k$, and driven by competent power. Upon the edges of the rollers $d\ e$ are cam-shaped reducing surfaces, $i\ i$, of a shape to reduce and extend the blank for two nails the proper extent between the heads, and adjacent to these cam surfaces $i$ are sectional flanges $o\ s$, the sectional flange $o$ on the roller $d$ being towards one edge of that roller, while the sectional flange $s$ on the roller $e$ is towards the other edge, so that there is between the said flanges, when they come around opposite to each other, an opening of a width corresponding to the width of the shank $a$ of the nail-blank, as seen in fig. 5, where the rollers are shown detached. When the advancing ends of the sectional flanges $o\ s$ come around, one passes on one side, and the other on the other of the shank $a$, and come up against the head $b$ of the nail-blank that has been standing between the rollers $d$ and $e$, unacted upon by said rollers after the cam-shaped reducing surfaces left said nail-blank upon the previous revolution of the rollers $d\ e$. As soon as the ends of $o\ s$ take the head of the nail-blank, the nail-rod is drawn along and reduced between one pair of heads and the next pair of heads, so as to form the shanks of the proper thickness and length. This movement passes the previously rolled pair of nails along to and between the cutting apparatus. $h$ is a standing cutter, so placed that the same is below the point where the pairs of nail-heads have to be separated at the time the nail-rod is stationary, and $l$ is a diagonal cutter, so placed as to be on the line where the respective nails are to be separated to form the points, by a diagonal cut, and $m$ is a cutter on a lever, $u$, to come down over the cutter $h$, and $n$ is a diagonal cutter on the same lever, matching the cutter $l$. This lever $u$ is actuated by the cam $q$, that is revolved in unison with the rollers $d\ e$, and acts upon the lever $u$ to separate the nails transversely between the pairs of heads, and diagonally, to form the points, in the manner shown in plan in fig. 2. The nails are to be straightened and finished by separate or after-acting mechanism.

What I claim, and desire to secure by Letters Patent, is—

1. Moving the rod of blanks forward, and adjusting successively each blank to its proper position, before the dies bite upon it, by means of the lateral flanges $o$ $s$, arranged and operating in the manner herein described.

2. I claim combining with devices for feeding the nail-blank the two pairs of cutters $h$ and $m$ and $l$ and $n$, arranged substantially as described.

3. I claim the combination of the cutters $h$ and $m$, $l$ and $n$, with the rollers $d$ and $e$, formed with cam-shaped surfaces $i$ and flanges $o$ and $s$, as and for the purposes specified.

Dated October 17, 1866.

THADDEUS FOWLER.

Witnesses:
CHAS. H. SMITH,
GEO. D. WALKER.